US012616187B2

(12) United States Patent
Venter et al.

(10) Patent No.: US 12,616,187 B2
(45) Date of Patent: May 5, 2026

(54) SYSTEM AND METHOD FOR DETERRING AQUATIC ANIMALS BY REMOTE CONTROL OF ELECTROMAGNETIC BARRIER

(71) Applicant: ARMAMENTS CORPORATION OF SOUTH AFRICA SOC LTD, Pretoria (ZA)

(72) Inventors: Jacob Venter, Pretoria (ZA); Johannes Van Wyk, Pretoria (ZA); Gabriel Jacobs, Pretoria (ZA)

(73) Assignee: ARMAMENTS CORPORATION OF SOUTH AFRICA SOC LTD, Pretoria (ZA)

( * ) Notice: Subject to any disclaimer, the term of this patent is extended or adjusted under 35 U.S.C. 154(b) by 57 days.

(21) Appl. No.: 18/569,321

(22) PCT Filed: Jun. 14, 2022

(86) PCT No.: PCT/IB2022/055489
§ 371 (c)(1),
(2) Date: Dec. 12, 2023

(87) PCT Pub. No.: WO2022/264024
PCT Pub. Date: Dec. 22, 2022

(65) Prior Publication Data
US 2024/0268367 A1 Aug. 15, 2024

(30) Foreign Application Priority Data
Jun. 17, 2021 (ZA) ................................. 2021/04125

(51) Int. Cl.
*A01M 29/24* (2011.01)
*A01K 61/10* (2017.01)

(52) U.S. Cl.
CPC ............. *A01M 29/24* (2013.01); *A01K 61/10* (2017.01)

(58) Field of Classification Search
CPC ........ A01M 29/24; A01K 61/10; A01K 79/02
(Continued)

(56) References Cited

U.S. PATENT DOCUMENTS 2,709,984 A * 6/1955 Marks .................... A01K 79/02
313/313
3,683,280 A 8/1972 Holt
(Continued)

FOREIGN PATENT DOCUMENTS

ES 2556223 A1 1/2016
JP H09-279553 A 10/1997
(Continued)

OTHER PUBLICATIONS

International Preliminary Report on Patentability for PCT International Patent Application No. PCT/IB2022/055489, dated Dec. 5, 2023.
(Continued)

*Primary Examiner* — Brady W Frazier
(74) *Attorney, Agent, or Firm* — Lathrop GPM LLP; James H. Velema, Esq.; Judith Stone-Hulslander

(57) ABSTRACT

The invention relates to a system for deterring aquatic animals. The system includes a plurality of deterrent modules which are spaced apart from, and interconnected with, each other, and which are, in use, positioned/located in a body of liquid at spaced apart positions/locations. The deterrent modules are configured to generate an electromagnetic field(s) between the spaced apart deterrent modules such that, when the deterrent modules are located in the body of liquid, an electro-magnetic field(s) is generated between the deterrent modules within the body of liquid, to
(Continued)

thereby form a non-physical barrier between the deterrent modules within the body of liquid, which deters aquatic animals. The system also includes a management module which is configured to monitor the operation or functioning of each deterrent module by receiving data from each deterrent module. The data received from each deterrent module relates to an operation or functioning of the particular deterrent module.

12 Claims, 3 Drawing Sheets

(58) Field of Classification Search
USPC .......................................................... 119/220
See application file for complete search history.

(56) References Cited

U.S. PATENT DOCUMENTS

| | | | |
|---|---|---|---|
| 3,822,403 | A | 7/1974 | Coleman et al. |
| 4,211,980 | A | 7/1980 | Stowell |
| 4,750,451 | A | 6/1988 | Smith |
| 4,825,810 | A | 5/1989 | Sharber |
| 5,341,764 | A | 8/1994 | Sharber |
| 5,445,111 | A | 8/1995 | Smith |
| 5,448,968 | A | 9/1995 | Ostlie |
| 5,566,643 | A | 10/1996 | Charter et al. |
| 7,270,083 | B2 | 9/2007 | Wescombe-Down |
| 7,412,944 | B2 | 8/2008 | Wescombe-Down |
| 8,456,310 | B2 | 6/2013 | Becker |
| 8,925,488 | B2 | 1/2015 | Smith |
| 9,820,474 | B2 | 11/2017 | Burger et al. |
| 2005/0000465 | A1 | 1/2005 | Wescombe-Down |
| 2010/0242851 | A1* | 9/2010 | Carstensen ............ A01K 79/02 |
| | | | 119/223 |
| 2018/0213769 | A1 | 8/2018 | Clowe |
| 2018/0310531 | A1 | 11/2018 | Hickson et al. |
| 2019/0264406 | A1 | 8/2019 | Furusawa |
| 2020/0137990 | A1 | 5/2020 | Tsikata |

FOREIGN PATENT DOCUMENTS

| | | | |
|---|---|---|---|
| JP | | 2851580 B2 | 1/1999 |
| WO | WO 1996/037099 | A1 | 11/1996 |
| WO | WO 2015/068873 | A1 | 5/2015 |
| WO | WO 2016/201517 | A1 | 12/2016 |

OTHER PUBLICATIONS

International Search Report and Written Opinion for PCT International Patent Application No. PCT/IB2022/055489, mailed Sep. 14, 2022.

* cited by examiner

SYSTEM AND METHOD FOR DETERRING AQUATIC ANIMALS BY REMOTE CONTROL OF ELECTROMAGNETIC BARRIER

RELATED APPLICATIONS

This application is a 35 U.S.C. § 371 filing of International Patent Application No. PCT/IB2022/055489, filed Jun. 14, 2022, which claims priority to South African Patent Application No. 2021/04125, filed Jun. 17, 2021, the entire contents of which are hereby incorporated herein by reference.

PRIOR ART

U.S. Pat. No. 5,566,643 relates to a method and apparatus for controlling aquatic animals, particularly sharks. Electrodes are immersed in a body of water and an electric field is created between the electrodes by applying electrical pulses thereto. In a preferred form of the invention, the pulses are generated in pulse trains each comprising a plurality of pulses.

U.S. Pat. No. 7,270,083 relates to a device for repelling selected aquatic creatures, such as sharks. The device consists of an electromagnetic field generator for generating an electromagnetic field that repels sharks and is supported by a buoyant device. This provides a shark-free region about the device. Multiple devices can be connected together to form an array of repelling devices, thereby extending the shark-free region.

U.S. Pat. No. 4,211,980 relates to a method for repelling sharks and the like by creating an electric field containing a zone about an anode and/or cathode electrodes submersed in salt water. A voltage gradient of sufficient magnitude to overstimulate the nervous system of a shark has been found. The electric field is determined by considering the free space solutions of Maxwell's electro-magnetic field equations. The d.c. square wave potential is applied to the electrodes for that period of time wherein electron flow from cathode to anode is continued. The square wave potential is maintained only long enough to allow nerve cell response in a shark.

WO1996037099 relates to an apparatus for repelling aquatic creatures such as sharks. The apparatus comprises of a pair of electrodes for immersion in a body of water and charge storage means such as a capacitor charged to a predetermined voltage by a charging circuit from a source of electrical power (e.g. a battery). It also includes a control logic to generate control signals and controllable switch elements, such as silicon-controlled rectifiers (SCR's), thyristors or the like. The thyristors connect the capacitor selectively to the electrodes in response to the control signals, to discharge the capacitor charge into the water, thereby to create an electrical field between the electrodes. The charging circuit may be a DC to DC converter that provides an output voltage higher than the battery voltage. The thyristors and associated circuitry are set to discharge the capacitor charge into the body of water in a series of pulses.

ES2556223 relates to a device and method attractor of sharks. The device comprises an electromagnetic module for the generation of an electromagnetic field by means of the electric excitation of two metallic electrodes in contact with water by means of a generating unit of electric pulses in a frequency range of 1-8 hz. The apparatus also includes an optical module with a light pattern generating unit in a band comprised between 440-560 nanometers wavelength; an acoustic-vibratory module with an acoustic transducer element responsible for generating vibrations in the water; and a frequency generating unit for the emission of acoustic underwater pulses configurable in frequency, amplitude and duration, in a bandwidth between 50 hz-20,000 hz.

U.S. Pat. No. 5,448,968 relates to an immaterial fish fence that is based on a combination of low frequency mechanical vibrations and synchronously modulated electric fields, where fish approaching the fence will be given at the same time fear reactions and directional information by mechanical vibrations, and in addition will feel pain due to the electric field. The fish will then turn and swim away. The fence is implemented by means of columns positioned side by side, each comprising a number of low frequency transducers suspended above each other, each column being suspended in a float. Each column also has two electrical conductors to which a high voltage can be delivered. Thus, synchronized fields of both acoustic and electric type can be generated between and around the columns.

U.S. Pat. No. 8,925,488 relates to a system and method for a controlled electrified fish barrier that induces a potential field in a body of water with an electric field generator, a control system, and an object detection system. When the anode and cathode of the electric field generator are inserted in a body of water, and the object detection system detects an object, the object detection system electrically signals the control system; and in response the control system electrically adjusts the electric field generator.

Other prior art documents which relate to the general field of technology includes: U.S. Pat. Nos. 3,822,403, 3,683,280, 4,825,810, 5,341,764, 4,750,451, 7,412,944, 8,456,310, 9,820,474 and WO2016201517.

BACKGROUND TO THE INVENTION

This invention relates to a system for deterring aquatic animals in a saline body of water. In particular, but not exclusively, the invention relates to a system for deterring marine animals, more specifically a system for deterring sharks.

Shark deterrent systems can generally be classified into two categories, namely active systems and passive systems.

Active systems (also referred to as "invisible barriers") refer to systems where a field (e.g. an electric field) is generated that has been deemed appropriate to deter sharks in a non-lethal manner, without necessarily impacting other marine species. One of the problems experienced with currently available active systems is that commercially available electric field generators for use as shark deterrents cannot be strung together ("daisy chained") nor synchronised to effectively make a barrier.

Other active systems that use magnets etc. to generate electric/magnetic fields are considered semi-active since no method of feedback exists to monitor system performance and efficacy for deterring sharks. Furthermore, most active systems are powered by batteries which causes unreliability and maintenance issues.

Passive systems (also known as "physical barriers") have been used extensively to deter sharks from entering zones. The definition of a passive system is therefore, a physical barrier that has been put in place to physically stop sharks from entering a defined space. What should immediately be noted is the exclusion of the phrases "non-lethal" and "impacting". Passive systems (such as "shark nets" or "drum lines") have been known to not be very forgiving to entanglement of other marine species and sharks themselves. This often results in the fatality of numerous marine species. Passive systems, such as "shark nets", also need to be visually inspected for holes etc. One of the problems with passive systems is that they cannot be effectively used in ports of entry where shipping lanes etc. are used, due to the risk of entanglement of the nets. The drawback of other passive repellent systems are the ecological burden of disposal, efficiency in protecting other marine life (such as tortoises, whales and dolphins) and finally the disruption to the ecosystem during installation, maintenance and replacement.

It is an object of this invention to alleviate at least some of the problems experienced with existing systems for deterring aquatic animals.

It is a further object of this invention to provide a system for deterring aquatic animals that will be a useful alternative to existing shark deterrent systems.

SUMMARY OF THE INVENTION

In accordance with a first aspect of the invention there is provided a system for deterring aquatic animals, the system including:

a plurality of deterrent modules/pods (hereinafter referred to as "deterrent modules") which are spaced apart from, and interconnected with, each other, and which are, in use, positioned/located in a body of liquid at spaced apart positions/locations, wherein the deterrent modules are configured to generate an electro-magnetic field(s) between the spaced apart deterrent modules such that, when the deterrent modules are located in the body of liquid, an electro-magnetic field(s) is generated between the deterrent modules within the body of liquid, to thereby form a non-physical barrier between the deterrent modules within the body of liquid, which deters aquatic animals; and a management module which is configured to monitor the operation or functioning of each deterrent module by receiving data from each deterrent module, wherein the data received from each deterrent module relates to an operation or functioning of the particular deterrent module.

The term "electro-magnetic field" should be interpreted to include an electric field and a subsequent magnetic field. In other words, the electro-magnetic field may more specifically be an electric field. The electro-magnetic field may specifically be a transverse electro-magnetic (TEM) field.

The management module may include:

a monitoring arrangement/module which monitors the operation or functioning of each deterrent module; and/or a controller which is configured to send one or more control instructions to each deterrent module, wherein each deterrent module is configured to perform one or more actions/operations based on the control instruction(s) received from the controller.

The actions/operations may be to activate or deactivate the particular deterrent module.

The monitoring arrangement/module and the controller may be incorporated into the same device, or they may be separate from one another. For example, the monitoring arrangement/module may be located at one location, while the controller may be located at another location.

The controller and/or the monitoring arrangement/module may, in use, be located remote from the deterrent modules. The controller may be located on land or on a ship/boat.

Each deterrent module may include a communication arrangement/module which is configured to communicate with the management module. The communication arrangement/module of each deterrent module may be configured to communicate wirelessly with the monitoring arrangement/module and/or the controller.

The management module may be configured to send data on the operation or functioning of each deterrent module to at least one computing device via a communication network/channel/link.

The computing device may be a mobile communication device. The data on the operation or functioning of each deterrent module may be sent wirelessly to the mobile communication device.

The system may include one or more servers which is/are configured to host a web interface and/or a mobile application which provides a user interface via which users may view the data on the operation or functioning of each deterrent module.

The system may be configured to receive a control instruction from a user via the user interface and to relay the control instruction to:

one or more of the deterrent modules, wherein the deterrent module(s) is/are configured to perform one or more actions/operations based on the received control instruction; or the controller which then sends the control instruction to one or more of the deterrent modules, wherein the deterrent module(s) is/are configured to perform one or more actions/operations based on the received control instruction.

The actions/operations may be to activate or deactivate the particular deterrent module.

The controller may, in use, be connected to a power supply (e.g. mains power/main power supply (120 or 220 VAC)), and the controller may be configured to supply power to one of the deterrent modules via a cable (or other power connecting means) which connects the controller to the said deterrent module, and wherein a power connection (e.g. a cable) extends between deterrent modules, in order to also supply power to the other deterrent modules, via the power supplied from the controller.

Each deterrent module may include two connection arrangements which are each configured to connect the deterrent module to an adjacent deterrent module which forms part of the plurality of deterrent modules, such that the deterrent modules are interconnected in a daisy chain fashion.

The body of liquid may be electrically conductive (i.e. capable of conducting electricity). The liquid may therefore include salt and/or other impurities in order to allow for the conduction of electricity. The liquid may be water which is electrically conductive (i.e. water with impurities, not pure/purified water). The body of liquid may be a saline body of water.

The body of liquid may be the sea. The system may be for deterring marine animals, more specifically sharks.

Each deterrent module may include an electrode which is configured to create/generate an electric field around each electrode such that electric fields are provided/located between the electrodes of adjacent deterrent modules. The electrode may be elongate and may extend substantially vertically in the body of liquid, when in use.

Each deterrent module may be configured to generate a pulse in/into the electrode, such that, when in use, an electric field is generated between the electrodes of adjacent modules, more specifically around the electrodes, which then results in electric fields being present in-between the electrodes.

Each deterrent module may include a buoyant body/ housing and the electrode may extend downwardly, or be suspended from, the body/housing.

The controller may be configured to synchronise the operation of the modules such that a non-physical barrier of an electric field(s) is formed, which stretches between/along the spaced apart modules, when in use.

The controller may be communicatively connected to the monitoring arrangement/module. The monitoring arrangement/module may be a remote monitor and may be used to activate and deactivate the system.

The remote monitor may graphically display the status data over time for each module and record the data from the controller.

The controller may include, or be connected to, a communication arrangement. The communication arrangement may connect the controller to the Internet and/or another communication network.

The controller may be configured to synchronise the operation of the electrodes, or the sequence in which electric fields are generated by the electrodes, by communicating with each deterrent module wirelessly.

The controller may be configured to operate each deterrent module such that each deterrent module generates a pulse in/into its electrode. More specifically, the controller may be configured to initiate continuous pulse repetition firing of each electrode.

The plurality of modules may be 3 or more modules, preferably 5 or more modules.

A communication/power line/cable may be connected between the connection arrangements of adjacent modules, in order to interconnect the deterrent modules. Power may therefore be sent from the controller to one of the modules to which it is connected, and a portion of the power may then be transferred on to the other modules via the communication/power line(s)/cable(s).

Adjacent modules may be interconnected via a rope, chain, cable, or the like.

The deterrent modules may be securable/secured to a mooring system. Each deterrent module may include a securing arrangement to fasten the deterrent module to the mooring system.

In accordance with a second aspect of the invention there is provided a deterrent module for deterring aquatic animals, the deterrent module including:

a field generator/generator arrangement which is configured to generate an electro-magnetic field in a body of liquid, when the module is placed/positioned in the body of liquid; and a communication module which is configured to send data which relates to an operation or functioning of the deterrent module via a communication link/network/ channel to a remote monitoring/management module.

As mentioned before, the term "electro-magnetic field" should be interpreted to include an electric field and a subsequent magnetic field. In other words the electro-magnetic field may more specifically be an electric field. The electro-magnetic field may specifically be a transverse electro-magnetic (TEM) field.

The body of liquid may be electrically conductive (i.e. capable of conducting electricity). The liquid may therefore include salt and/or other impurities in order to allow for the conduction of electricity. The liquid may be water which is electrically conductive (i.e. not pure/purified water). The body of liquid may be a saline body of water.

The body of liquid may be the sea. The deterrent module may be for deterring marine animals, more specifically sharks.

The deterrent module may include at least two connection arrangements, wherein each connection arrangement is configured to allow the module to be connected to another deterrent module, in order to allow a plurality of deterrent modules to be interconnected to one another in a daisy chain fashion, when in use.

The deterrent module may include an electrode which is configured to create/generate an electric field, when in operation. The deterrent module may include a buoyant body/housing. The electrode may extend downwardly from, or is suspended from, the body/housing such that when the deterrent module is located/positioned in the body of liquid, the electrode extends downwardly from the buoyant body/ housing towards a bottom of the body of liquid.

The communication module may be configured to receive control instructions via a communication link/network/channel. The deterrent module may be configured to perform one or more actions in response to receiving a control instruction.

The actions/operations may be to activate or deactivate the particular deterrent module.

The deterrent module may be securable/secured to a mooring system. The deterrent module may include a securing arrangement to fasten the deterrent module to the mooring system, when in use.

In accordance with a third aspect of the invention there is provided a method of deterring aquatic animals in a body of liquid, wherein the method includes:

installing a plurality of deterrent modules, which are interconnected with one another, in a body of liquid at spaced apart positions/locations, wherein the deterrent modules are configured to generate an electric field(s) between the spaced apart deterrent modules such that an electro-magnetic field(s) is generated between the deterrent modules within the body of liquid, to thereby form a non-physical barrier between the deterrent modules within the body of liquid, which deters aquatic animals; and from each deterrent module, sending data relating to the operation or functioning of the particular deterrent module to a remote management module.

The method may include:

at each deterrent module, receiving control instructions from a user via a communication network/link/channel and performing one or more actions in response to the control instructions.

The method may include providing a user interface to users, wherein the user interface is accessible via a web interface or mobile application, and whereby the user interface displays data on the operation or functioning of each deterrent module.

The method may include receiving a control instruction from a user via the user interface and sending the control instruction via the user interface to one or more of the deterrent modules.

The body of liquid may be the sea. The deterrent module may be for deterring marine animals, more specifically sharks.

The method may include securing the deterrent modules to a mooring system.

BRIEF DESCRIPTION OF THE DRAWINGS

The invention will now be described in more detail, by way of example only, with reference to the accompanying drawings in which.

DESCRIPTION OF THE ILLUSTRATED EMBODIMENT

Figures 1, 2, 3:
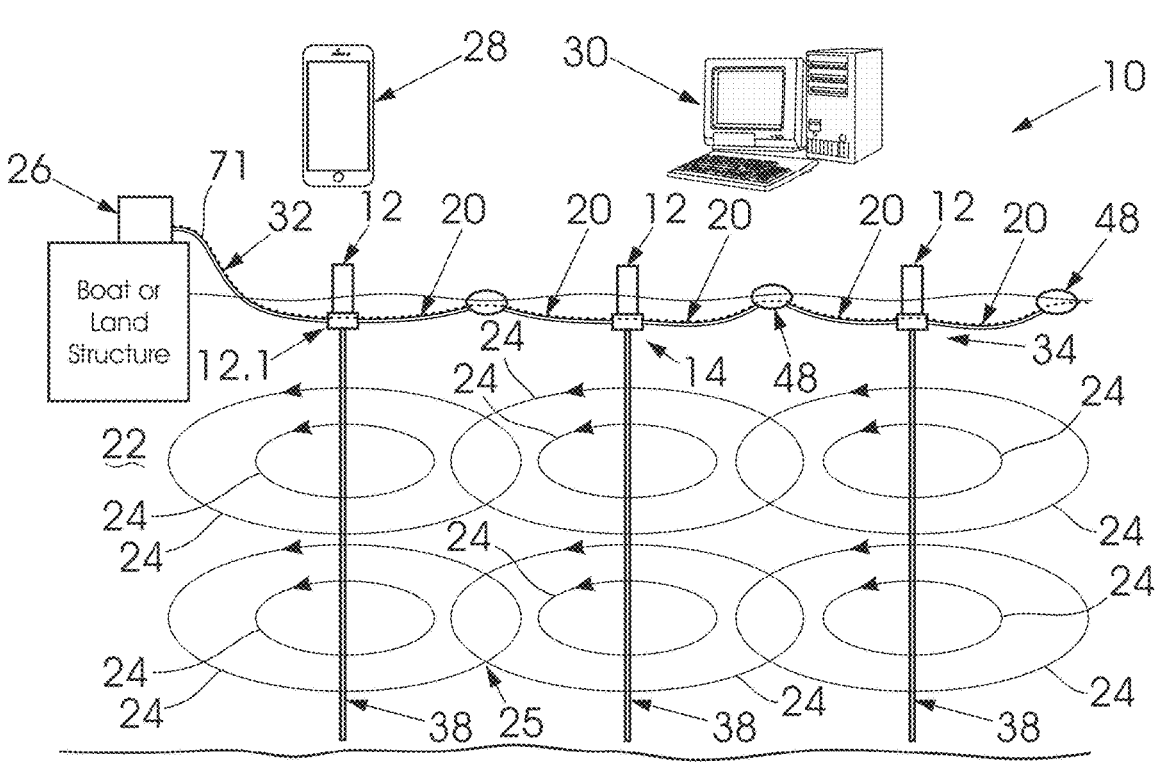
FIG. 1 shows a schematic layout of the system for deterring aquatic animals in accordance with the invention.
FIG. 2 shows a schematic diagram of a deterrent module, in accordance with the invention, which forms part of the system of FIG. 1.
FIG. 3 shows a schematic diagram of two deterrent modules of the system of FIG. 1, which are connected in series.

Referring to the drawings, in which like numerals indicate like features, a non-limiting schematic diagram of a system for deterring aquatic animals, in accordance with the invention, is generally indicated by reference numeral 10. The aquatic animals are typically located in a body of liquid, such as the sea 22.

Figures 6, 7:
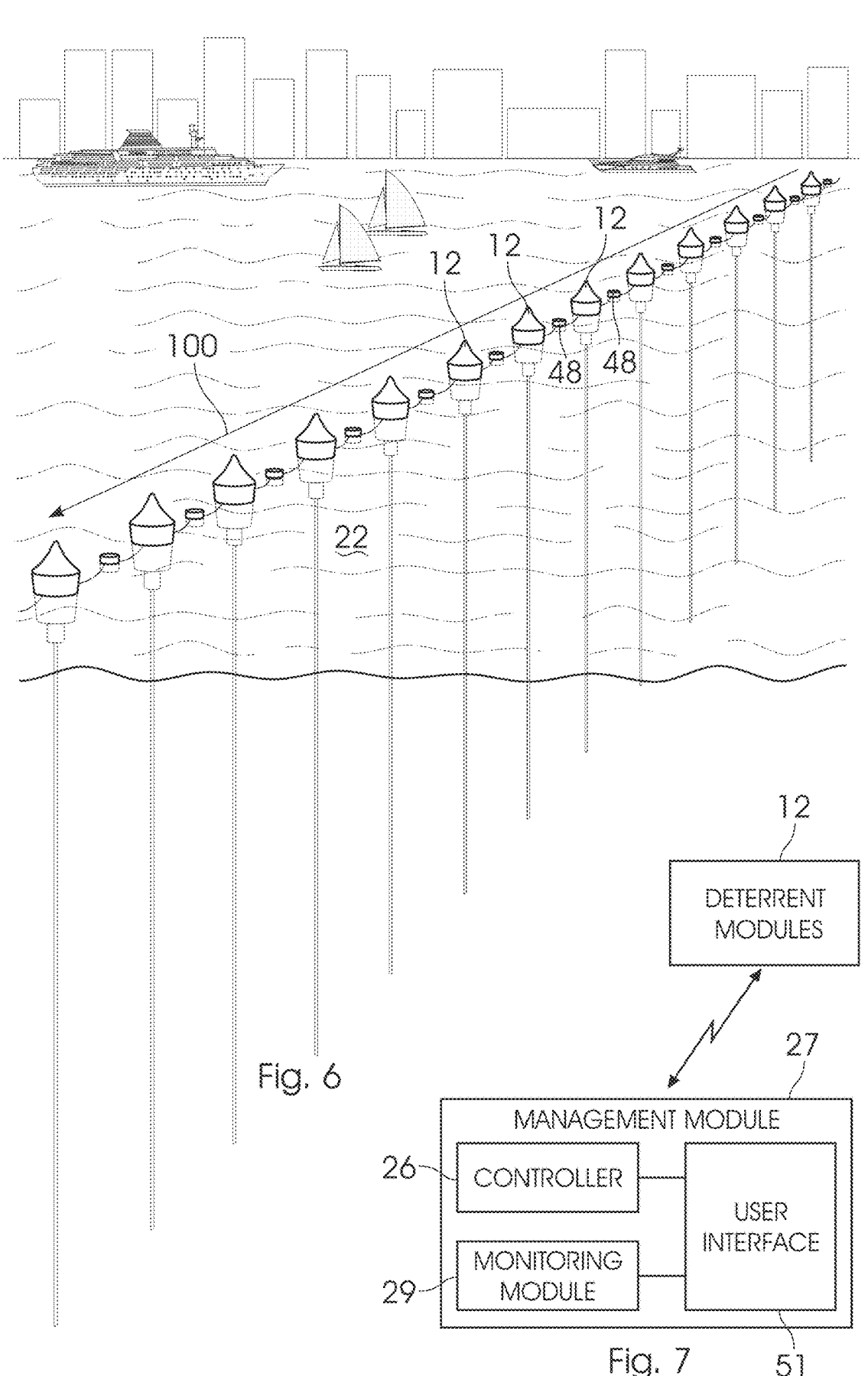
FIG. 6 shows a practical illustration of the system of FIG. 1, when installed in the sea.
FIG. 7 shows another schematic layout of the system for deterring aquatic animals in accordance with the invention.

The system 10 comprises of a plurality of deterrent modules/pods 12 which are spaced apart from, and interconnected with, each other using a connection arrangement 14 (see FIG. 3). Each deterrent module 12 includes two connection arrangements 14.1, 14.2, wherein the one connection arrangement 14.1 includes a male connector 16 on one side of the module 12, and the other connection arrangement 14.2 includes a female connector 18 on an opposite side of the deterrent module 12, in order to allow adjacent deterrent modules 12 to be interconnected. The interconnection effectively provides a string/series of deterrent modules 12 which are spaced along a path (see reference numeral 100 in FIG. 6), when in use. A cable 20, more specifically a floating cable 20, is used to connect adjacent deterrent modules 12 to each other via the male connector 16 and female connector 18. A middle/central portion of each cable 20 may be supported by a float/floatation buoy 48, which floats on the liquid 22, thereby aiding in the overall buoyancy of the system 10. The spacing between the adjacent deterrent modules 12 is preferably about 3 meters. However, this spacing may vary. When in use, the plurality of deterrent modules 12 are typically positioned/located in a body of liquid 22 at spaced apart positions/locations. It should be noted that the body of liquid should be electrically conductive. The body of liquid can therefore be the sea/ocean or a river/dam (provided that the river/dam water includes impurities in order to allow it to conduct electricity). For the purposes of the description below reference to a body of water refers specifically to a body of water which is electrically conductive.

The deterrent modules 12 each include a securing arrangement 44, more specifically one or two anchoring points 44, to fasten the assembly of deterrent modules 12 to a mooring system 71. This measure is taken to ensure that the deterrent modules 12 can withstand extreme environmental challenges faced as a result of the aquatic environment (e.g. during storms). The mooring system 71 typically includes/consists of ropes/cables and anchors to keep part of the barrier/system 10, which is located in the sea 22, in place against wave action. The anchor points 44 of the deterrent modules 12 are fastened to a rope/cable that runs the full length of the system 10. This rope/cable can be combined with the cable 20 through a braid and fed through the floatation buoy 48. The mooring system 71 is also anchored on either side of the system 10. It is thus anchored at a point close to the shore (near the cable 32) and at a point furthest from the shore at the end of the series of deterrent modules 12. The specific configuration of the mooring system 71 will however depend on the deployment terrain.

Each deterrent module 12 includes a buoyant, waterproof body/housing 46 and an electric field generator/generator arrangement 34 which is configured to generate an electric field. The housing typically has a cylindrical shape with diameter of about 200 mm and a height of about 500 mm.

The electric field generator/generator arrangement 34 includes an electrode 38 which extends downwardly from (or is suspended from) the housing 46, when the housing 46 is positioned in the body of water 22 (e.g. the sea). As shown in FIG. 1, in use, the housing 46 floats at the top of, and is partially submerged in, the body of water 22, while the electrode 38 extends downwardly therefrom towards a bottom of the body of water. When the electrodes 38 of the deterrent modules 12 are activated, each of them generates an electric field perpendicular to the surface of the electrode 38. The resulting field intensity forms concentric circles around the electrode 38, as illustrated by reference numeral 24. Since the deterrent modules 12 are spaced along a path 100, the generated electric fields 24 extend (or are located between) adjacent electrodes 38, thereby effectively creating a non-physical barrier between adjacent electrodes. More specifically, the electric fields 24 of adjacent electrodes 38 typically overlap each other (e.g. see reference numeral 25), in order to help ensure that an effective deterrent barrier is formed there between, in order to help deter sharks and/or other aquatic animals along the path 100.

The electric field generator/generator arrangement 34 typically includes a custom printed circuit board (PCB), to which the electrode 38 is connected, which is housed inside a casing/housing 36, and then sealed inside the housing 46. Each deterrent module 12 includes a wireless communication module/arrangement 40 (see FIG. 2) which is configured to communicate wirelessly with a remote management module/arrangement 27. The management module/arrangement 27 can include a controller 26 (described later on) which can send control instructions wirelessly to the deterrent modules 12 and a monitoring module 29 which monitors the operation of the deterrent modules 12. The controller 26 and monitoring module 29 may be incorporated into the same device or may be installed at the same location. However the controller 26 and monitoring module 29 may be separate and remote from each other.

The PCB is responsible for general housekeeping and generating a unique electric field pulse which is transmitted to the electrode 38. System housekeeping pertains to:

a) The validation of feedback measurements

The controller continuously receives feedback from the installed floating pods (12) via the wireless communication modules (43). For system safety and data integrity the system continuously checks whether all the pods are still communicating and whether the received performance data complies to the implemented data structures and protocols.

b) Checking operating system parameters

The system controller continuously checks whether the system users have changed any of the operating conditions, such as switching the system on or off. The controller also checks the local hosting platform for overheating, sufficient power, etc.

c) Measuring supply parameters

The power supplied to the floating system (100) is pre-conditioned to ensure optimal operation of the pods (12). Because the system knows what output parameters (voltage and current) should be, it can continuously benchmark performance based on measurements taken by the controller input interfaces.

d) Checking integrity of the floating system 100

The integrity of the system (100) is dependent on the performance of the individual pods (12). These pods continuously communicate generated field information and unique ID's back to the controller to display and evaluate whether the individual pod (12) is still within operational limits.

e) Testing and validating performance of individual pods/modules (12)

The controller can be instructed by the user to perform a system (100) self-test on each individual pod (12). Here the controller instructs all the pods via a broadcast to interrupt routine operation, generate a field and relay the required field measurement back to the controller. The purpose of this feature is routine health check and maintenance checks before and after maintenance interventions.

f) Keeping a stable internet connection

This function forms part of the user interface, were incoming data is displayed in a user friendly manner. The connection refers to stable user interface access where network connections are continuously tested.

The PCB also communicates, via the wireless communication module 40, telemetry back to the controller 26 using an antenna 42 of the wireless communication module 40.

The controller 26 is typically located on land (e.g. a jetty or land structure) or on a ship/boat and is configured to send control instructions wirelessly to the wireless communication modules 40 of the deterrent modules 12. The electric field generators/generator arrangements 34 are, in turn, configured to operate/activate their electrodes 38, based on the received control instructions. The controller 26 is more specifically configured to send control instructions to the various deterrent modules 12 such that the sequence in which the deterrent modules 12 generate electric fields are synchronised, and whereby the electric fields are generated through continuous pulse repetition firing into the electrode. With regards to the synchronisation, it should be noted that, in order to optimise the generation of efficient electric fields, the conduction paths should be synchronised to ensure that the fields are concentrated around the respective firing electrodes 38. Thus the firing is synchronised to ensure maximum field generation around the electrode 38 that is firing. The electric field 24 generated around each electrode 38 typically overlap with the electric fields 24 generated around adjacent electrodes 38. All these electric fields 24 essentially form a series of electric fields which stretches along the path 100, thereby creating an invisible barrier for deterring sharks (and possibly other marine animals) from crossing the barrier.

Each module 12 further includes a signal light 43, which is typically located at an upper tip of the antenna 42. Preferably, the signal light 43 is a 180° signal light. The signal lights 43 are used to visually relay information pertaining to the system health and status. The flashing sequence and colour will help the maintainer/operator to ease fault finding and visual inspections. Basically the same information that can be seen on a display screen of a phone 28 (see specifically reference numerals 80, 82 and 84 which are described later on), can be relayed using the lights. Lights also act as beacons to warn of its (12,100) presence. The light can also help staff to identify when a particular module(s) 12 has moved out of bounds (e.g. into an area which might be hazardous to ships). The light 43 can therefore effectively be used as a beacon in the sea. This is especially helpful in ports of entry.

It should be appreciated that each deterrent module 12 may include its own internal controller which is configured to control the operation of that specific module 12. The said controller may also then monitor the operation of the particular module, or alternatively send information to the controller 26 or the remote monitoring module 29 for monitoring purposes. More specifically, each deterrent module 12 is configured to send data which relates to the operation and/or functioning of the particular deterrent module 12 to the monitoring module 29. The sending of data can be done in real-time.

The controller 26 is connected to a mains power supply (e.g. 120/220 $V_{AC}$) (not shown), such as an upstream power supply from a local power station, and supplies power to a first module 12.1 of the series of module 12 (e.g. the module 12.1 nearest to the controller 26) using a cable 32. Power is also then relayed to the other modules 12 via the cables 20 (which are also interconnected to the cables of the mooring system 71) which interconnect all the deterrent modules 12.

As mentioned, each deterrent module 12 transmits an electric pulse into its respective electrode 38. As a result, perpendicular electric fields emanate from the electrode 38. The fields are generated along the length of the electrode (i.e. vertically). The length of the electrode 38 is typically a function of the depth of the ocean 22 in which it is installed. However, the maximum length is typically 12 meters.

Figure 4:
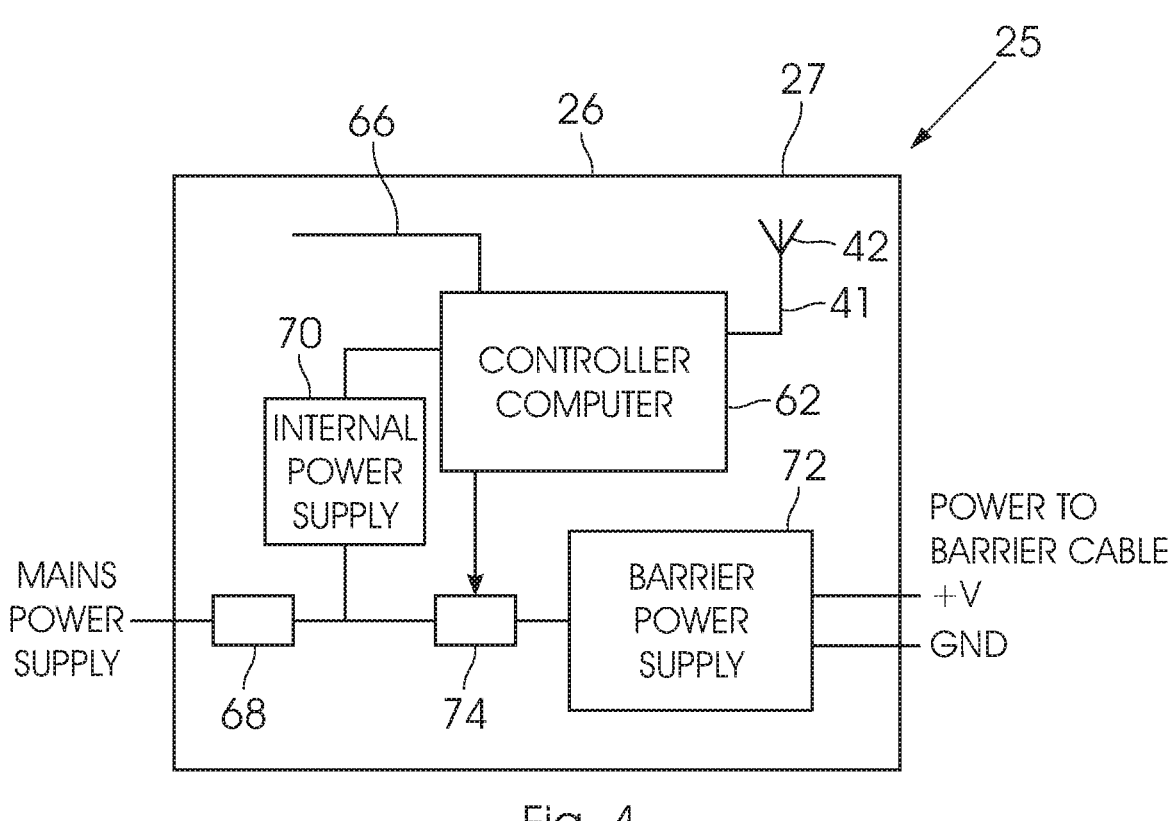
FIG. 4 shows a schematic diagram of a controller/controller unit which forms part of the system of FIG. 1.

In the example shown in FIG. 4, the controller 26 and remote monitoring module 29 are incorporated into the same device. This device may be referred to as the "host" of the system 10. The controller 26 is typically positioned on a boat or land structure, such as a jetty or a coastal feature. The controller 26 includes a processor/CPU 62 and a communication arrangement/module 41 which is configured to communicate wirelessly with the deterrent modules 12 (e.g. via a radio link). More specifically, the communication arrangement/module 41 includes the antenna 42 for communication purposes. The controller 26 also performs its own housekeeping while continuously testing the integrity of the system.

From an electrical safety perspective, the controller 26 includes a mains circuit breaker 68, short circuit protection, and keyed mains safe connectors. The controller 26 also includes a power switch 74. The controller 26 is installed via a main plug (no additional installation is typically required).

The controller 26 is also equipped with an internal power supply 70 and a barrier power supply 72 to supply power to the cables 32 and 20.

The controller 26 also includes an Internet connection 66, in order to allow the controller 26 to communicate with a client via the Internet.

The remote monitoring arrangement 27 includes an Internet connection and is configured to host user interface 51 for users, who want to gain access to information regarding the operation/functioning of the system 10. More specifically, the remote monitoring module 29 may include a web server, or communicate with a web server via the Internet, whereby the web server hosts a web interface and a mobile application through which a user may gain access to the information, e.g. by visiting a webpage on a laptop computer 30 (e.g. at a remote monitoring station, such as a maintenance office) or via a mobile app installed on a mobile phone/tablet 28. During operation, each deterrent module 12 sends data on its operation or functioning to the remote monitoring module 29, which then displays this data on the user interface 51 to a user (e.g. which accesses the user interface 51 by using a computer or smart phone/tablet). The user interface 51 is configured to allow a user to send control instructions to the individual deterrent modules 12 (e.g. to activate or deactivate the module 12) via the user interface.

The remote controller 26 and the monitoring module 29 are responsible for hosting the user interface 51 to the users and the control and diagnostics of the cables 32 and 20. Through the interface 51, users can view, monitor, test and switch on/off the system 10.

More specifically, the cable 32 connects the controller 26 to the system (100), whereas the cable 20 interconnects the individual pods 12. The pre-conditioned power emanating from the controller power supply is critical to the low voltage power supply to the local pod controller 12 logic and the power that is required to generate the deterrent field 2) via the electrode 38. Thus the integrity of the cable is continuously checked by the controller 26 by measuring the current and voltage of the supply cable and comparing it to predetermined operational limits. The diagnostics of the cable is important to ensure optimal field generation and finally acts as a system safety function.

From the above, it should be appreciated that the controller 26 and remote monitoring module 29 typically interact with a user using his phone 28/computer 30 via an Internet connection (e.g. through a web server), in order to provide the following functionalities via the user interface 51:

The user can use his phone 28/computer 30 to (i) test the system, (ii) evaluate the status of the system 10 and (iii) activate or deactivate the system 10 (e.g. a user may deactivate the system during maintenance interventions—the deactivated status will be displayed on the display of the phone 28). With regards to testing, a user may request a system test, where the system individually tests, measures and validates the performance of each individual pod 12 and displays the information on a phone 28 (see reference numerals 80, 82 and 84). More specifically, the system test refers to the user giving the controller 26 an instruction via the user interface (28 or 30) to broadcast a signal generation cycle. The individual pod 12 then measures the generated field and transmits the measured data back to the controller 26. The controller 26 then checks the integrity of the received data and correlates the measured field data to accepted operating thresholds. The controller 26 then deduces whether the pod 12 in system 100 is still functional and reports accordingly (i.e. to the phone 28 or computer 30) with a status (80,82,84). A visual display of the functionality for each of the deterrent modules 12 is provided on a display screen of the phone 28/computer 30 (see FIG. 5). It should be borne in mind that, since it is possible to establish a communication with the controller 26 via the web server, any computing device that has Internet connectivity can typically access the controller 26, i.e. a smart phone, tablet or laptop computer, etc.

A user can perform a Go/No Go test on all the modules 12 in the system 10, using his phone 28/computer 30.

In one example, the computer 30 may be provided at a remote station 30 or at a maintenance office, which may be used for more detailed testing of the modules 12 and the cables 32 and 20.

Figure 5:
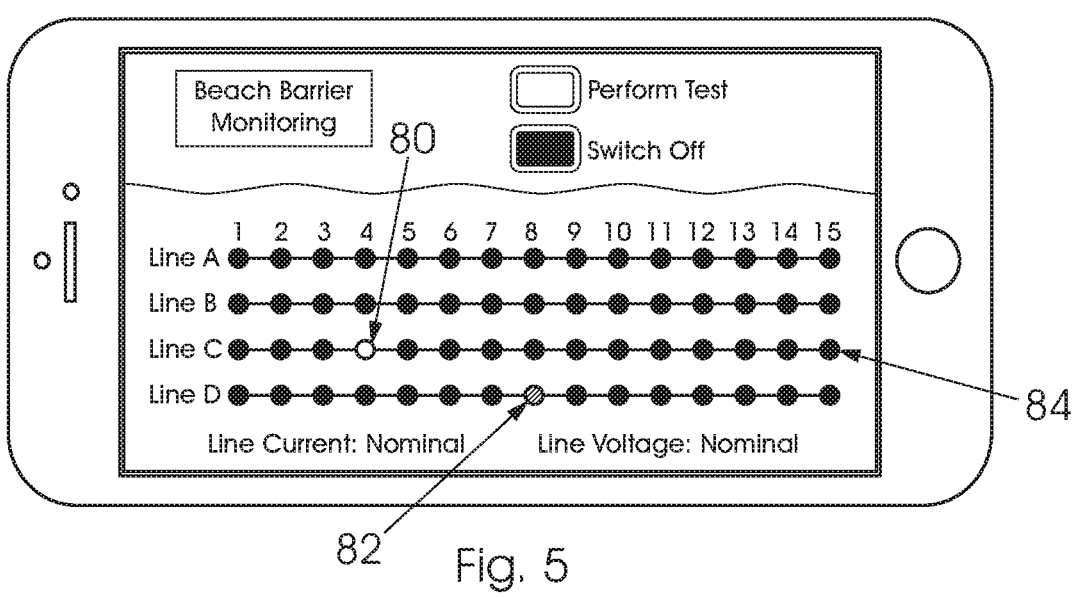
FIG. 5 shows a remote monitor/monitoring arrangement for the system of FIG. 1.

Information of the status of each module 12 is typically communicated to the user's phone 28/computer 30, which is then displayed graphically on the user interface 51, as shown in FIG. 5. In this regard, see for example:

reference numeral 80 which indicates that a particular deterrent module 12 is off;

reference numeral 82 which indicates that a particular deterrent module 12 is faulty; and reference numeral 84 which indicates that a particular deterrent module 12 is on.

The phone 28/computer 30 of the user can store all data received from the controller 26 on a database (e.g. for further analysis at a later stage).

The system 10 is typically installed in a body of water 22, such as the sea, by interconnecting the plurality of deterrent modules 12 using the cables 20. The deterrent modules 12 are then placed into the body of water 22 such that they are spaced along a path along which a barrier is required to deter aquatic animals, specifically sharks (see FIG. 6). The cable 32 connects and secures the plurality of modules 12 to the controller (e.g. located on a boat or a land structure) and supplies power to the deterrent modules 12. The floats 48 are used to help with the buoyancy of the system 10, more specifically the cables 20. Once installed, each deterrent module 12 sends operational/functional data in real-time to the monitoring module 29 which then makes the data available via a server(s), which can be accessed by users by using their computers or phones. Control instructions can then be sent by users via the user interface 51, which is then communicated to the individual deterrent modules 12.

The Inventor believes that the present invention offers several advantages over traditional shark deterring systems, some of which are summarised below:

1. The system 10 is non-lethal.
2. Since the system does not form a physical barrier, such as a net, it drastically reduces the risk of entanglement for marine animals.
3. The system 10 is maintainable, modular, and reliable.
4. The system 10 can perform self-diagnostics and issue relevant notifications to operators and clients.
5. The system 10 enables remote monitoring of its performance and relevant maintenance notifications.
6. The system 10 has user friendly, informative, and accessible user maintenance interfaces to make the system 10 easy to monitor, operate and maintain.
7. The system 10 is marine safe and effective in deterring sharks.
8. The system 10 is automated and active.
9. The system 10 is non-invasive and can be integrated into the day to day operations of the aquatic environment (such as swimming, surfing etc.).
10. The system 10 can easily be replaced and maintained, due to its modular design.
11. The system can be removed from the water relatively easily, if needed (e.g. during big storms etc.).
12. The modules 12 used in the system 10 can be strung together and synchronised to effectively provide an invisible barrier.
13. The system 10 is powered by a mains power with the required electrical safety measures in place (as mentioned earlier).

The invention claimed is:

1. A system for deterring aquatic animals, the system including:

a plurality of deterrent modules which are spaced apart from, and interconnected with, each other, and which are, in use, positioned in a body of water at spaced apart positions, wherein the plurality of deterrent modules each includes an electrode which is configured to generate an electric field so that electric fields are provided between the electrodes of adjacent deterrent modules such that, when the plurality of deterrent modules are located in the body of water, an electro-magnetic field(s) is generated between the plurality of deterrent modules within the body of water, to thereby form a non-physical barrier between the plurality of deterrent modules within the body of water, which deters aquatic animals; and a remote management arrangement which includes:

a controller which is configured to send control instructions to each deterrent module of the plurality of deterrent modules, and a monitoring arrangement which is configured to monitor the operation of each deterrent module of the plurality of deterrent modules by receiving data from each deterrent module, wherein the data received from each deterrent module relates to an operation of the particular deterrent module, wherein each deterrent module of the plurality of deterrent modules is configured to send data to the monitoring arrangement, wherein the data relates to an operation of the particular deterrent module, wherein the system further includes:

a user interface which is hosted as a web interface on a web server or which is provided via a mobile application, wherein the system is configured to receive a control instruction from a user via the user interface and to relay the control instruction to:

one or more of the plurality of deterrent modules, wherein each deterrent module is configured to perform one or more operations if the deterrent model receives a control instruction from the user interface, or the controller which then sends the control instruction to one or more of the plurality of deterrent modules, wherein each deterrent module is configured to perform one or more operations if it receives a control instruction from the controller.

2. The system of claim 1, wherein each deterrent module of the plurality of deterrent modules includes a communication arrangement which is configured to communicate with the remote management arrangement.

3. The system of claim 2, wherein the communication arrangement of each deterrent module of the plurality of deterrent modules is configured to communicate wirelessly with the remote management arrangement.

4. The system of claim 1, wherein the remote management arrangement is, in use, connected to a power supply, and wherein the remote management arrangement controller is configured to supply power to one of the plurality of deterrent modules via a cable which connects the remote management arrangement to the said deterrent module, and wherein a power connection extends between the plurality of deterrent modules, in order to also supply power to the other deterrent modules, via the power supplied from the remote management arrangement.

5. The system of claim 1, wherein the system is for deterring sharks.

6. A method of deterring aquatic animals in a body of water, wherein the method includes:

installing a plurality of deterrent modules, which are interconnected with one another, in a body of water at spaced apart positions, wherein the plurality of deterrent modules each includes an electrode which is configured to generate an electric field so that electric fields are provided between the electrodes of adjacent deterrent modules such that an electro-magnetic field(s) is generated between the plurality of deterrent modules within the body of water, to thereby form a non-physical barrier between the plurality of deterrent modules within the body of water, which deters aquatic animals, and a buoyant housing and wherein the electrode of the deterrent module extends downwardly, or is suspended from, the housing;

receiving a control instruction(s) via a wireless communication network from a user via a user interface which is hosted as a web interface on a web server or which is provided via a mobile application;

relaying the control instruction(s) to one or more of the plurality of deterrent modules; and performing one or more operations, using the one or more deterrent modules, based on the control instruction(s) received by the one or more deterrent modules.

7. The system of claim 1, wherein the controller is configured to perform a self-test on each deterrent module of the plurality of deterrent modules by sending an instruction to each deterrent module to interrupt routine operation and generate an electric field, and then to relay a field measurement back to the controller, whereby each deterrent module is configured to generate and measure an electric field in response to receiving the said instruction and transmit field data on the field measurement back to the controller.

8. The system of claim 7, wherein the controller is configured to correlate the received field data to accepted operating thresholds.

9. The system of claim 7, wherein the controller is configured to perform the self-test in response to receiving an instruction to self-test from a mobile communication device of a user via the user interface, and after receiving field data from each deterrent module, to communicate a status for each deterrent module back to the user via the user interface on whether each of the deterrent modules are still functional.

10. The system of claim 1, wherein the controller is configured to send control instructions to the various deterrent modules of the plurality of deterrent modules such that a sequence in which the deterrent modules generate electric fields are synchronized.

11. The method of claim 6, which includes performing a self-test on each deterrent module of the plurality of deterrent modules by sending an instruction via a communication network to each of the deterrent modules to interrupt routine operation and generate an electric field, and then to send a field measurement back via the communication network, and at each deterrent module, generating and measuring an electric field in response to receiving the said instruction and transmitting field data on the field measurement back via the communication network.

12. The method of claim 11, wherein the step of performing the self-test includes sending an instruction from a mobile communication device, via a communication network, to each of the deterrent modules to interrupt routine operation and generate an electric field, and then to send a field measurement back via the communication network.

* * * * *